United States Patent
Hopka

(10) Patent No.: US 11,441,463 B1
(45) Date of Patent: Sep. 13, 2022

(54) SYSTEM AND METHOD FOR HEATING A CATALYST

(71) Applicant: Ford Global Technologies, LLC, Dearborn, MI (US)

(72) Inventor: Michael Hopka, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/302,791

(22) Filed: May 12, 2021

(51) Int. Cl.
*F01N 3/20* (2006.01)
*F01N 9/00* (2006.01)
*H02P 9/00* (2006.01)
*H02P 101/45* (2016.01)

(52) U.S. Cl.
CPC .............. *F01N 3/2013* (2013.01); *F01N 9/00* (2013.01); *H02P 9/006* (2013.01); *F01N 2240/16* (2013.01); *F01N 2390/02* (2013.01); *F01N 2900/1404* (2013.01); *H02P 2101/45* (2015.01)

(58) Field of Classification Search
CPC ...... F01N 3/2013; F01N 9/00; F01N 2240/16; F01N 2390/02; F01N 2900/1404; H02P 9/006; H02P 2101/45
See application file for complete search history.

(56) References Cited

U.S. PATENT DOCUMENTS

| | | | |
|---|---|---|---|
| 5,321,231 A | 6/1994 | Schmalzriedt et al. | |
| 5,488,283 A | 1/1996 | Dougherty et al. | |
| 5,528,148 A | 6/1996 | Rogers | |
| 5,966,931 A | 10/1999 | Yoshizaki et al. | |
| 6,003,304 A * | 12/1999 | Swanson | F01N 11/00 219/508 |

FOREIGN PATENT DOCUMENTS

EP 1508682 A2 2/2005

\* cited by examiner

*Primary Examiner* — Brandon D Lee
(74) *Attorney, Agent, or Firm* — Vincent Mastrogiacomo; McCoy Russell LLP

(57) ABSTRACT

Systems and methods for providing electric energy to an electrically heated catalyst are described. In one example, the electrically heated catalyst may be a three phase device with heating elements that are arranged in a delta configuration. In other examples, the electrically heated catalyst may include a single heating element.

7 Claims, 6 Drawing Sheets

SYSTEM AND METHOD FOR HEATING A CATALYST

FIELD

The present description relates to a system and method for operating an electrically heated catalyst. The system and methods may include an alternator that is dedicated to supplying electrical power to the electrically heated catalyst.

BACKGROUND AND SUMMARY

A vehicle may include an electrically heated catalyst to reduce catalyst light off time (e.g., a temperature at which catalyst efficiency exceeds a threshold level, such as 50% conversion efficiency), so that tailpipe emissions may be reduced. The electrically heated catalyst may include a resistance type heater that may consume significant levels of electrical power during some periods and smaller amounts of electrical power during other periods. One way to control the amount of power that is supplied to the electrically heated catalyst may be to regulate power flow to the electrically heated catalyst via placing switching devices between the electrically heated catalyst and a power supply bus. However, cost of high power switching devices and pulse width modulation circuitry may be higher than desired. In addition, a size of an alternator that has capacity to supply power to the electrically heated catalyst and the vehicle's other electric power consumers may be substantially larger than may be desired. Further, it may be undesirable to warranty a battery as part of an emissions control system.

The inventors herein have recognized the above-mentioned issues and have developed a vehicle system, comprising: an engine; a first alternator including an armature, the armature not in electrical communication with an electric energy storage device; a second alternator; an electrically heated catalyst electrically coupled to the first alternator and not electrically coupled to the second alternator; and a battery electrically coupled to the second alternator.

By including two alternators in a vehicle's electrical system, it may be possible to provide the technical result of improving power delivery to an electrically heated catalyst. In particular, output power of an alternator that is a sole power source for an electrically heated catalyst may be controlled via adjusting field current that is supplied to the alternator so that switching devices need not be placed between the alternator and the electrically heated catalyst. In addition, the alternator and the electrically heated catalyst need not be electrically coupled to a battery so that a special battery warrantee may be needed. Further, use of a very large alternator may be avoided.

The present description may provide several advantages. In particular, the approach may improve power delivery to an electrically heated catalyst. In addition, the approach may simplify to control of an alternator. Further, the approach may electrically isolate the electrically heated catalyst from the vehicle's battery and other electric power consumers so that operation of emissions systems components may be partitioned from operation of components that are not emissions related.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to providing electrical power to an electrically heated catalyst. The electric power may be provided via an alternator that is dedicated to supplying only the electrically heated catalyst with electric power. As such, output of the alternator may be adjusted via adjusting alternator field current in response to a temperature. The temperature may be an exhaust gas temperature, catalyst temperature, or other temperature that may be indicative of catalyst efficiency. The electrically heated catalyst may be included in an exhaust system of an internal combustion engine of the type shown in FIG. 1 or a diesel engine. The internal combustion engine and heated catalyst may be included in a vehicle as shown in FIG. 2. The vehicle may include an alternator, which may be of the type shown in FIG. 3 or FIG. 4. The alternator may be operated according to the sequence of FIG. 5. A flowchart of a method for operating the alternator is shown in FIG. 6.

Figure 1:
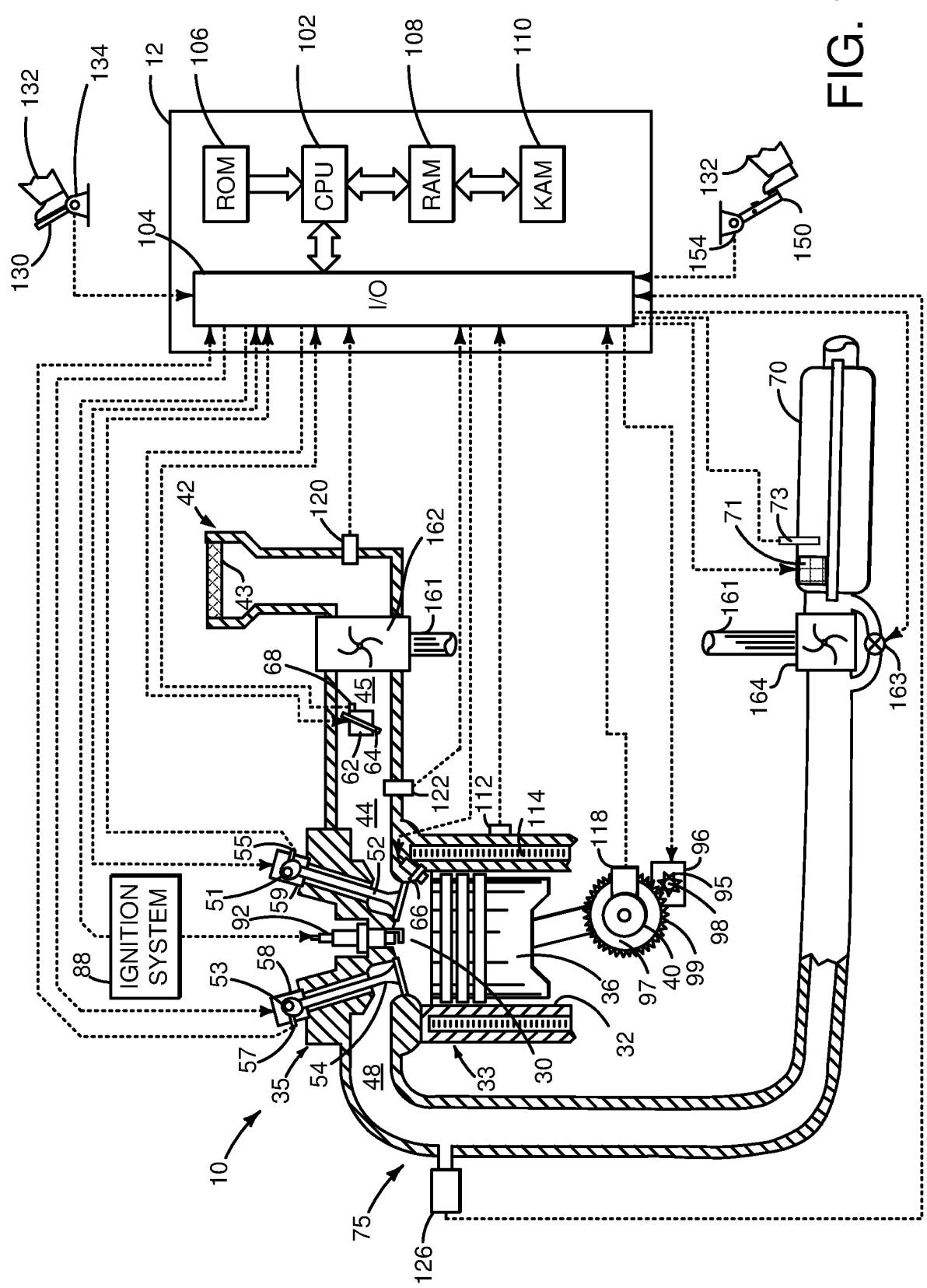
FIG. 1 is a schematic diagram of an engine and an exhaust system that includes an electrically heated catalyst.
Figure 2:
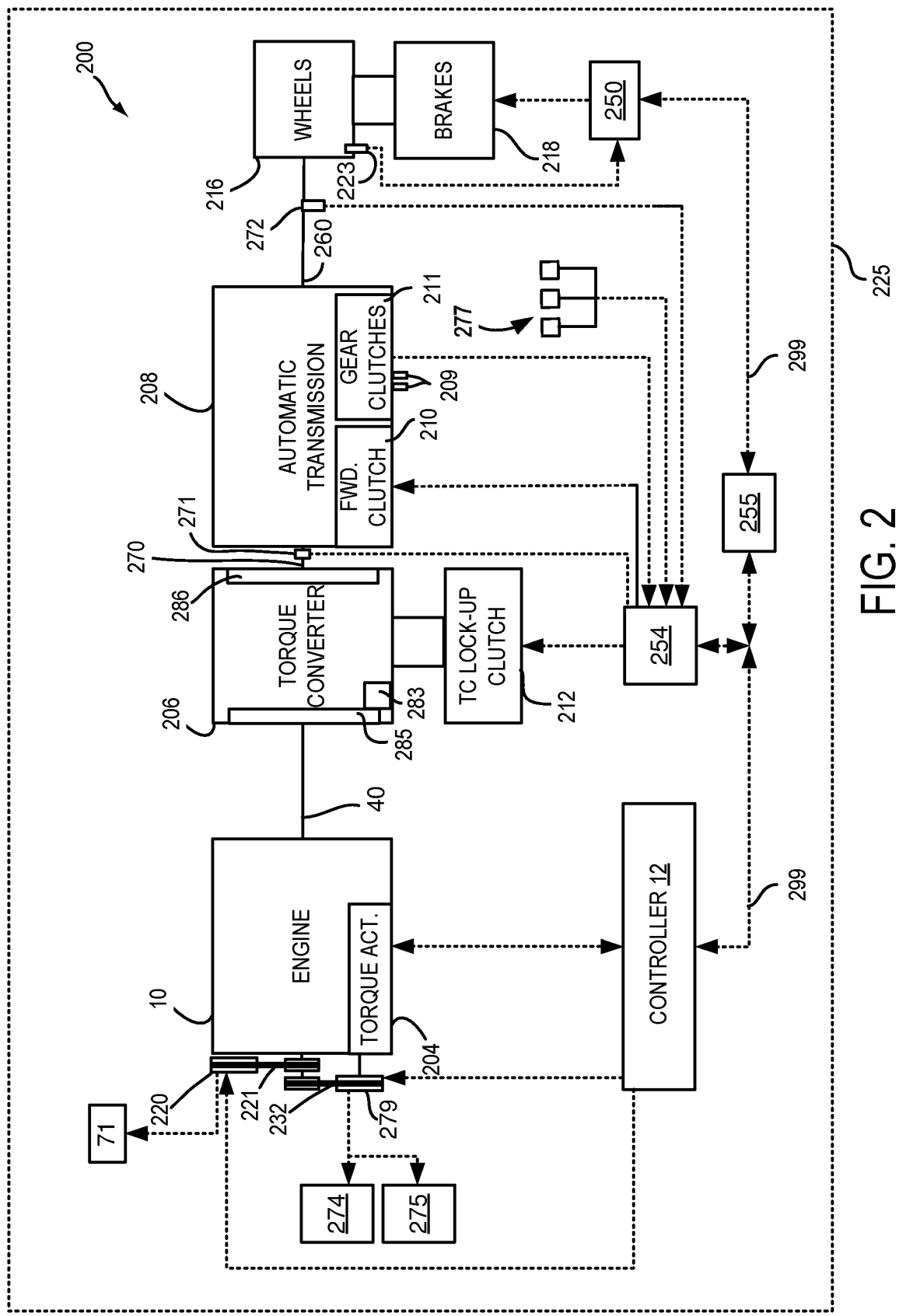
FIG. 2 is a schematic diagram of a vehicle that includes two alternators.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-4 and employs the actuators shown in FIGS. 1-4 to adjust engine and emissions device operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake camshaft 51 and an exhaust camshaft 53. The position of intake camshaft 51 may be determined by intake camshaft sensor 55. The position of exhaust camshaft 53 may be determined by exhaust camshaft sensor 57. Intake valves may be held open or closed over an entire engine cycle as the engine rotates via deactivating intake valve actuator 59, which may electrically, hydraulically, or mechanically operate intake valves. Alternatively, intake valves may be opened and closed during a cycle of the engine. Exhaust valves may be held open or closed over an entire engine cycle (e.g., two engine revolutions) as the engine rotates via deactivating exhaust valve actuator 58, which may be electrically, hydraulically, or mechanically operate exhaust valves. Alternatively, exhaust valves may be opened and closed during a cycle of the engine.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Alternatively, compressor 162 may be electrically powered. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Exhaust system 75 may include temperature sensor 73, converter 70, exhaust manifold 48, turbine 164, and electrically heated catalyst 71. Converter 70 can include multiple catalyst bricks, in one example. In another example, multiple emission control devices, each with multiple bricks, can be used. Converter 70 can be a three-way type catalyst in one example. An electrically heated catalyst 71 may reduce an amount of time it takes converter 70 to reach a light-off temperature. Temperature sensor 73 may sense exhaust gas temperature, catalyst temperature, electrically heated catalyst temperature, or a temperature of other exhaust system components.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, and brake controller 250. In some examples, electric machine controller 252 may be included in engine controller 12, or vehicle system controller 255, or in alternator 279. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a braking torque from brake controller 250.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10. Engine 10 may be started with an engine starting system shown in FIG. 1. Engine output torque may be provided to first three phase alternator 220 via belt 221 and second three phase alternator 279 via belt 232. First three phase alternator 220 is electrically coupled to only electrically heated catalyst 71. Second three phase alternator 279 may supply electrical energy to electric energy storage device (e.g., battery) 274 and other electric power consumers (e.g., lights, infotainment systems, etc.) 275. First alternator 220 may be coupled to crankshaft 40 via belt 221. Likewise, second alternator 279 may be coupled to crankshaft 40 via belt 232. The output voltage of first alternator 220 may be adjusted via adjusting an electric current that is supplied to a field winding of first alternator 220. Similarly, the output voltage of second alternator 279 may be adjusted via adjusting an electric current that is supplied to a field winding of second alternator 279. Second three phase alternator 279 may be configured similar to the alternator 220 shown in FIG. 3. The armature of the first alternator is not in electrical communication with an electric energy storage device or the armature of the second alternator. The electrically heated catalyst 71 is not electrically coupled to an armature of the second alternator. Rather, the output of the first alternator is electrically isolated from output of the second alternator.

An engine output torque may be transmitted to torque converter 206. Torque converter 206 includes a turbine 286 to output torque to input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request. Torque converter 206 also includes pump 283 that pressurizes fluid to operate gear clutches 211. Pump 283 is driven via impeller 285, which rotates at a same speed as engine 10.

Automatic transmission 208 includes gear clutches (e.g., gears 1-10) 211 and forward clutch 210. Automatic transmission 208 is a fixed step ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210. In some examples, automatic transmission 208 may be replaced with a manual transmission.

A frictional force may be applied to wheels 216 by engaging friction wheel brakes 218. In one example, friction wheel brakes 218 may be engaged in response to the human driver pressing his/her foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his/her foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then commands engine 10 in response to the driver demand torque. Vehicle system controller 255 requests the engine torque from engine controller 12. If engine torque is less than a transmission input torque limit (e.g., a threshold value not to be exceeded), the torque is delivered to torque converter 206, which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 274, a charging torque (e.g., a negative alternator torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then commands friction brakes 218 (e.g., desired friction brake wheel torque).

Accordingly, torque control of the various powertrain components may be supervised by vehicle system controller 255 with local torque control for the engine 10, transmission 208, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Figure 3:
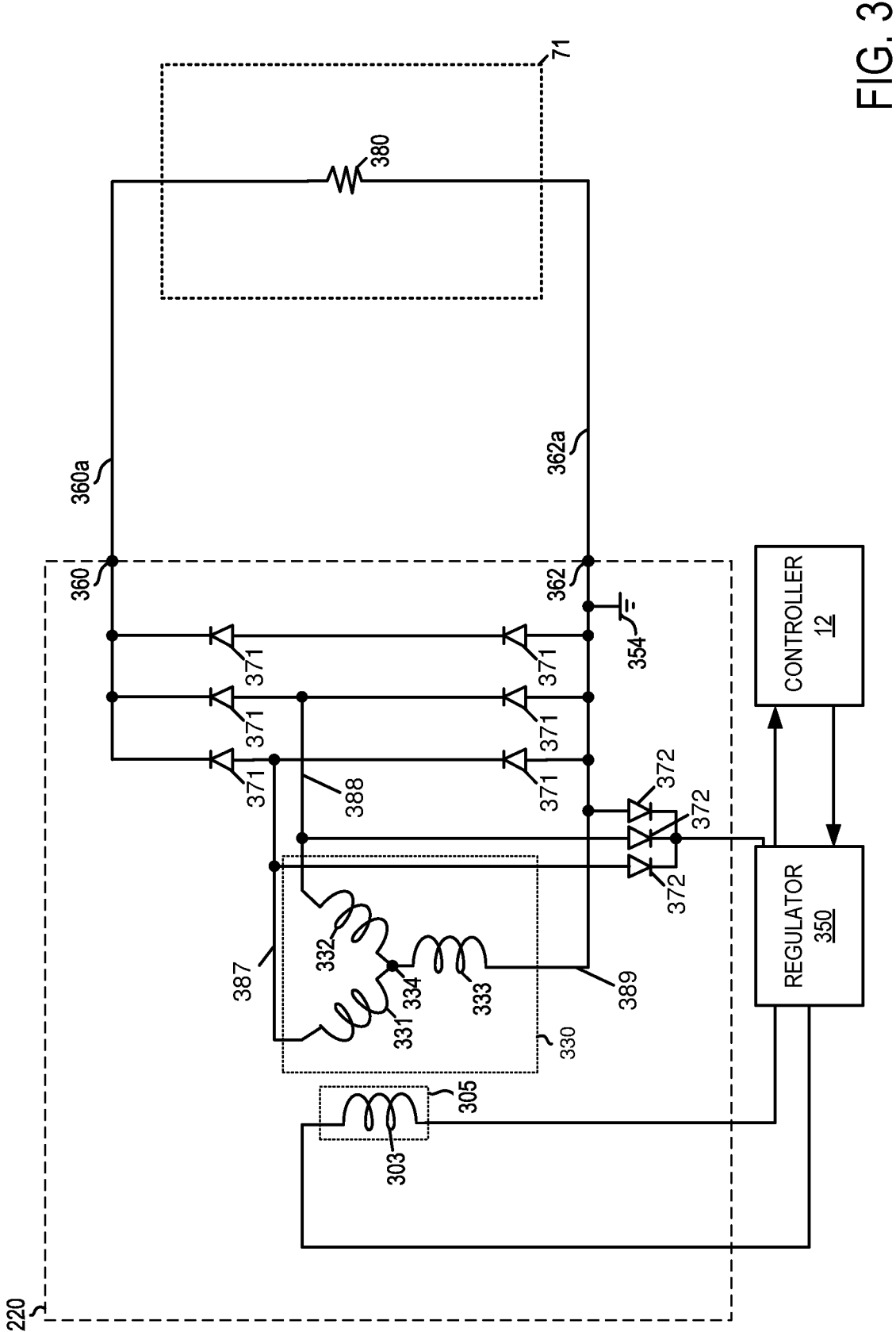
FIGS. 3 and 4 are schematic diagrams of example alternators.

Electric machine controller 252 may control torque output and electrical energy production from alternator 279 by adjusting current flowing to and from field and/or armature windings as described in greater detail in the description of FIG. 3. Electrical output from alternator 279 may be provided in a stationary mode where the transmission is in park or neutral. Additionally, electrical output from the alternator 279 may be provided in a non-stationary mode where the vehicle is traveling on a road.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), alternator temperature sensors, and BISG temperature sensors, and ambient temperature sensors.

Brake controller 250 receives wheel speed information via wheel speed sensor 223 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Referring now to FIG. 3, a detailed schematic of a first embodiment of first alternator 220 and a first embodiment of electrically heated catalyst 71 is shown. A positive terminal 360 of first alternator 220 is shown electrically coupled to electrically heated catalyst 71 via conductor 360a. A negative terminal 362 of first alternator 220 is also shown electrically coupled to electrically heated catalyst 71 via conductor 362a. Negative terminal 362 may be referenced to ground 354. In this example, electrically heated catalyst is a single phase device with one heating element 380.

First alternator 220 includes a field winding 303 that is wound to a rotor 305 and three armature winding coils 331-333 that are wound to a stator 330. Armature coils 331-333 are directly coupled together at node 334 and each of these coils provides one phase of three-phase electrical output of first alternator 220. Armature coil 331 generates an A phase voltage, armature coil 332 generates a B phase voltage, and armature coil 333 generates a C phase voltage. An amount of electric current supplied by first alternator 220 to electrically heated catalyst 71 may be adjusted via adjusting an amount of field current that flows to field winding 303. Voltage regulator 350 may adjust the amount of electric current that flows to field winding 303 in response to input or commands supplied via controller 12.

Output of armature windings 331, 332, and 333 is rectified via a full wave rectifier that is formed by six individual diodes 371. Output of armature windings 331, 332, and 333 may also be rectified via individual diodes 372. Consequently, alternator 220 outputs a direct current (DC) to electrically heated catalyst 71. The output of diodes 372 may be supplied as feedback to regulator 350.

Figure 4:
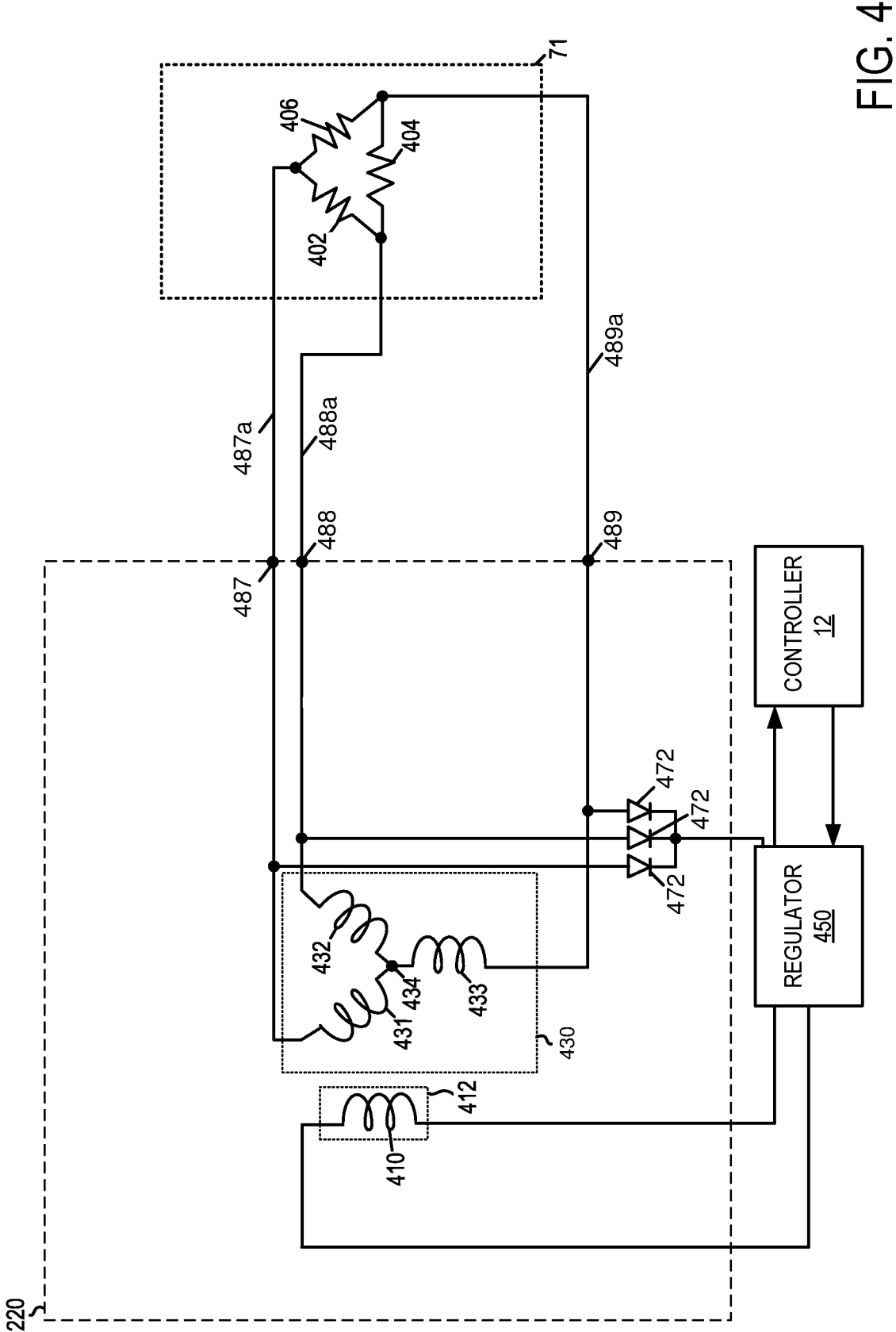

Referring now to FIG. 4, a detailed schematic of a second embodiment of first alternator 220 and a second embodiment of electrically heated catalyst 71 is shown. In this example, first alternator 220 outputs power in three separate phases (e.g., phase A, phase B, and phase C). Phase A terminal 487 is shown directly coupled to first resistor 402 and second resistor 406 with no intervening components other than conductor 487a. Phase B terminal 488 is shown directly coupled to first resistor 402 and third resistor 404 with no intervening components other than conductor 488a. Phase C terminal 489 is shown directly coupled to third resistor 404 and second resistor 406 with no intervening components other than conductor 489a. In this example, electrically heated catalyst is a three phase device with three resistive heating elements 402-406.

First alternator 220 includes a field winding 410 that is wound to a rotor 412 and three armature winding coils 431-433 that are wound to a stator 430. Armature coils 431-433 are directly coupled together at node 434 and each of these coils provides one phase of three-phase electrical output of first alternator 220. Armature coil 431 generates an A phase voltage, armature coil 432 generates a B phase voltage, and armature coil 433 generates a C phase voltage. An amount of electric current supplied by first alternator 220 to electrically heated catalyst 71 may be adjusted via adjusting an amount of field current that flows to field winding 410. Voltage regulator 450 may adjust the amount of electric current that flows to field winding 410 in response to input or commands supplied via controller 12.

Output of armature windings 431, 432, and 433 is not rectified and first alternator 220 does not include a rectifier for output that is delivered to electrically heated catalyst 71. Resistive heating elements 402-404 are electrically coupled in a delta configuration. The resistive heating elements are coupled at nodes 470, 471, and 472. Consequently, alternator 220 outputs three phase alternating current (AC) to electrically heated catalyst 71. The output of diodes 472 may be supplied as feedback to regulator 450.

Thus, the system of FIGS. 1-4 provides for a vehicle system, comprising: an engine; a first alternator including an armature, the armature not in electrical communication with an electric energy storage device; a second alternator; an electrically heated catalyst electrically coupled to the first alternator and not electrically coupled to the second alternator; and a battery electrically coupled to the second alternator. The vehicle system further comprises a controller including executable instructions stored in non-transitory memory that cause electric current to be supplied to a field winding of the first alternator when the first alternator is supplying electrical energy to the electrically heated catalyst.

In some examples, the vehicle system further comprises additional instructions that cause electric current to not be supplied to the field winding of the first alternator when the first alternator is not supplying electrical energy to the electrically heated catalyst. The vehicle system further comprises additional instructions to prevent increasing electric current supplied to the field winding of the first alternator and increasing electric current supplied to a field winding of the second alternator at a substantially same time. The vehicle system includes where the first alternator does not include a voltage rectifier. The vehicle system further comprises additional instructions to vary an amount electric current provided to the field of the first alternator as a temperature of the electrically heated catalyst varies. The vehicle system includes where the first alternator includes a voltage rectifier.

The system of FIGS. 1-4 also provides for a vehicle system, comprising: an engine; a three phase alternator including armature windings; a three phase electrically heated catalyst including three heating elements arranged in a delta configuration electrically coupled to the armature windings. The vehicle system further comprises a controller, the controller including executable instructions stored in non-transitory memory that cause the controller to supply electrical energy to a field winding of the three phase alternator in response to a temperature. The vehicle system further comprises additional instructions to cease supplying electrical energy to the field winding of the three phase alternator in response to the temperature. The vehicle system includes where the three phase alternator is mechanically coupled to the engine, and where the three phase electrically heated catalyst is including in an exhaust system of the engine. The vehicle system includes where three heating elements are resistive elements.

Figure 5:
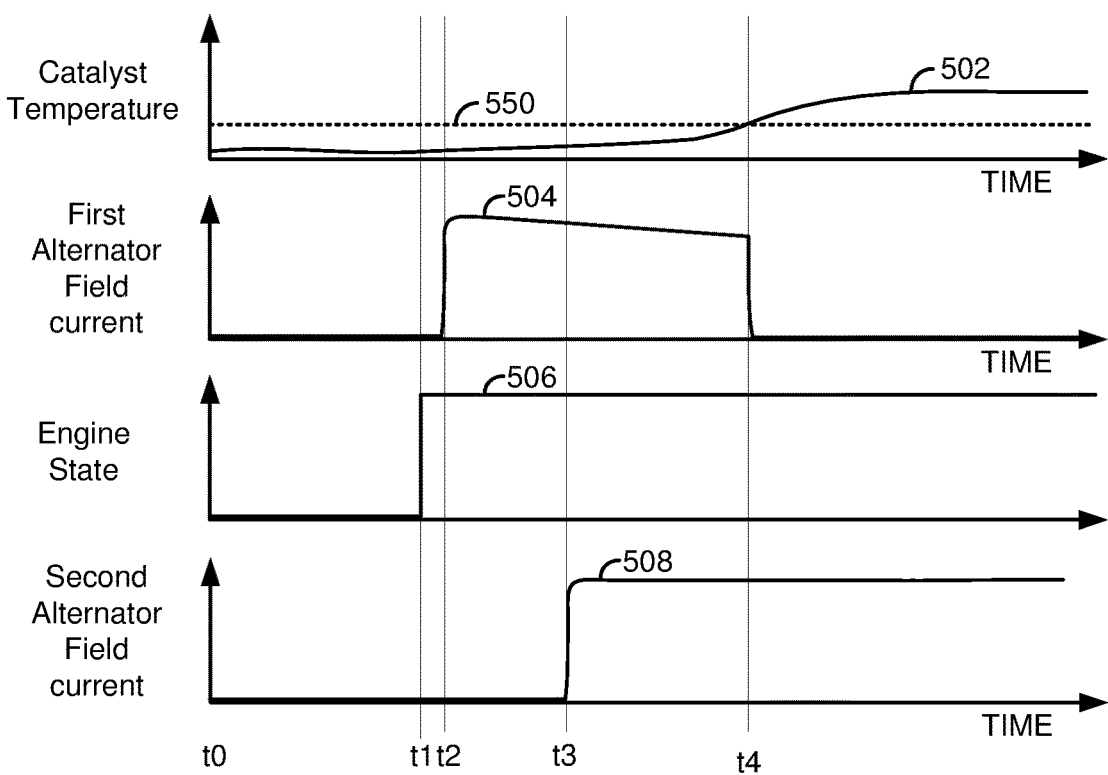
FIG. 5 shows an operating sequence for the two alternators shown in FIG. 2.
Figure 6:
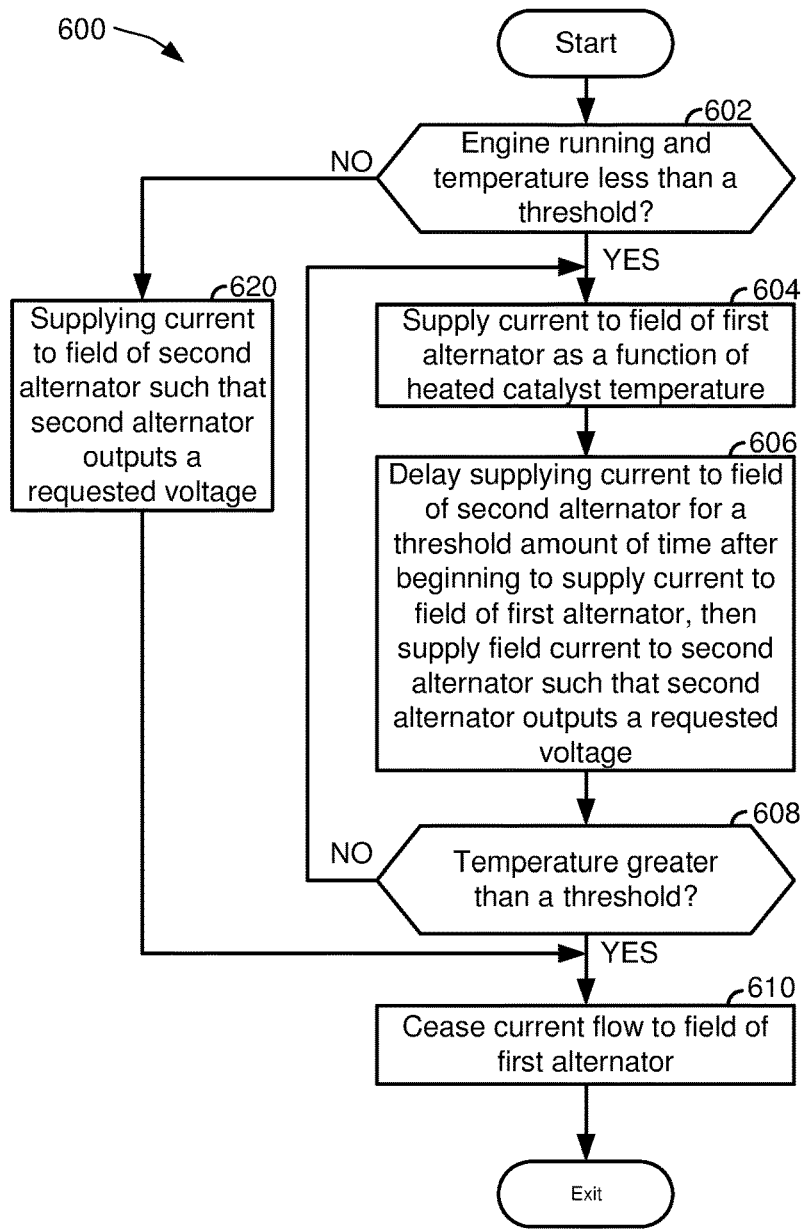
FIG. 6 shows an example method for operating one or more alternators.

Referring now to FIG. 5, a prophetic example sequence showing alternator operation during an engine start is shown. The plots are time aligned and occur at a same time. The sequence of FIG. 5 may be generated via the system of FIGS. 1-4 in cooperation with the method of FIG. 6. The vertical lines at time t0-t4 represent times of interest in the sequence.

The first plot from the top of FIG. 5 is a plot of a catalyst temperature versus time. The vertical axis represents the catalyst temperature and the catalyst temperature increases in the direction of the vertical axis arrow. The horizontal axis represents time and time increase from the left side of the plot to the right side of the plot. Trace 502 represents the catalyst temperature. Horizontal line 550 represents a threshold catalyst temperature (e.g., catalyst light off temperature).

The second plot from the top of FIG. 5 is a plot of alternator field current for a first alternator (e.g., 220) versus time. The vertical axis represents first alternator's field current and first alternator's field current increases in the direction of the vertical axis arrow. The horizontal axis represents time and time increases from the left side of the figure to the right side of the figure. Trace 504 represents first alternator field current.

The third plot from the top of FIG. 5 is a plot of engine operating state versus time. The vertical axis represents engine operating state and the engine is off (e.g., not rotating and not combusting fuel) when trace 506 is at a lower level near the horizontal axis. The engine is on (e.g., rotating and combusting fuel) when trace 506 is at a higher level near the vertical axis arrow. Trace 506 represents the engine operating state. The horizontal axis represents time and time increases from the left side of the figure to the right side of the figure.

The fourth plot from the top of FIG. 5 is a plot of alternator field current for a second alternator (e.g., 279) versus time. The vertical axis represents first alternator's field current and first alternator's field current increases in the direction of the vertical axis arrow. The horizontal axis represents time and time increases from the left side of the figure to the right side of the figure. Trace 504 represents first alternator field current.

At time t0, the engine is stopped (e.g., not combusting fuel and not rotating) as indicated by the engine state. The catalyst temperature is below threshold 550 and field current for the first and second alternators is zero.

At time t1, the engine is started as indicated by the engine state. The catalyst temperature remains low and field current for the first alternator and the second alternator is zero. Shortly after the engine is stated, an amount of field current delivered to the first alternator (e.g., the amount of electric current that is supplied to the field winding of an alternator) is increased at time t2 so that the first alternator begins supplying electric power to the electrically heated catalyst. Field current is not delivered to the second alternator at time t2 so that the load that is applied to the engine via the first and second alternators may be reduced. Reducing the load on the engine may prevent a speed of the engine from falling farther than may be desired. The catalyst temperature begins increasing due to heat being generated in the electrically heated catalyst.

At time t3, the amount of field current that is supplied to the second alternator is increased so that the second alternator may begin charging a battery and suppling power to ancillary electric power consumers. Field current continues to be supplied to the first alternator so that the electrically heated catalyst may continue to help increase catalyst temperature. Additionally, the field current that is supplied to the first alternator is reduced as the catalyst temperature increases so that electrical power consumption may be reduced. Alternatively, a constant amount of field current may be supplied to the first alternator so that catalyst heating time may be minimized. The catalyst temperature continues to rise. Thus, the field current that is supplied to the second alternator may be delayed so that a large load may not be applied to the engine all at once and so that field current of the first alternator and field current of the second alternator do not increase at a substantially same time (e.g., within 3 seconds of each other). Consequently, a speed of the engine may not deviate from a requested speed by a large amount.

At time t4, catalyst temperature exceeds threshold 550. Therefore, field current flow to the first alternator is ceased (e.g., adjusted to zero) so that the load on the engine may be reduced. Decreasing engine load may reduce the engine's fuel consumption. The engine continues to run and current continues to flow to the field of the second alternator.

In this way, the alternator field current may be adjusted to control output of an alternator to an electrically heated catalyst. The field current of the alternator may be reduced to zero when a temperature (e.g., a catalyst temperature) exceeds a threshold temperature so that engine fuel consumption may be reduced. Further, field current increases made to two alternators that are driven via a same engine may be staggered in time so that a predetermined amount of time may exist between times when the field current is increased.

Referring now to FIG. 6, a method for operating an alternator that may supply electrical power to an electrically heated catalyst is shown. The method of FIG. 6 may provide the sequence shown in FIG. 5 in conjunction with the system of FIGS. 1-4. Further, at least portions of the method of FIG. 6 may be incorporated into a controller as executable instructions stored in non-transitory memory, while other portions of the method may be actions performed in the physical world via the system.

At 602, method 600 judges if the engine is running (e.g., rotating and combusting fuel) and a temperature is less than a threshold temperature. The temperature may be an exhaust gas temperature, a catalyst temperature, or a temperature of another exhaust system component. In one example, the threshold temperature is a catalyst light-off temperature. If method 600 judges that the engine is running and the temperature is less than a threshold temperature, the answer is yes and method 600 proceeds to 604. Otherwise, the answer is no and method 600 proceeds to 620.

At 620, method 600 supplies electric current to a field winding of a second alternator (e.g., 279 of FIG. 2) of a vehicle. The amount of current that is supplied to the field of the second alternator is adjusted such that the second alternator outputs a requested voltage (e.g., 14 volts DC). The second alternator may charge a battery and supply electric power to ancillary power consumers of the vehicle (e.g., lights, infotainment center, etc.). Method 600 proceeds to 610.

At 610, method 600 ceases flowing electric current to a field winding of a first alternator of the vehicle. Method 600 may command the current amount that is supplied to the field winding of the first alternator to zero. By commanding the field current supplied to the first alternator to zero, electric energy supplied to the electrically heated catalyst 71 is reduced to zero. As such, a load on the engine is reduced so that engine fuel consumption may be reduced. Method 600 proceeds to exit.

At 604, method 600 begins supplying electric current to the field windings (e.g., field current) of the first alternator. In one example, method 600 may adjust the amount of electric current that is supplied to the field windings of the first alternator as a function of a temperature.

The temperature may be an exhaust gas temperature, catalyst temperature, heated catalyst temperature, or another temperature of the exhaust system. For example, if catalyst temperature is increasing, the amount of electric current that is supplied to the field windings of the first alternator may be reduced. In another example, method 600 may adjust the amount of electric current that is supplied to the field winding of the first alternator to a constant value. Increasing the amount of current that is supplied to the field windings may increase the power output of the first alternator. The first alternator may output a DC voltage, or the first alternator may output three phase power. The first alternator supplies electric current to only an electrically heated catalyst. Method 600 proceeds to 606.

At 606, method 600 prevents an increase in an amount of field current that is supplied to a second alternator of the vehicle for a threshold amount of time following an increase in field current supplied to the first alternator. Thus, increases in the amount of field current supplied to the second alternator are delayed for a threshold amount of time so that a large load may not be applied to the engine all at once. By avoiding large load changes to the engine, the engine idle speed control may be improved. Further, driveline torque disturbances may be reduced.

Method 600 may supply current to the field winding of the second alternator after the threshold amount of time has passed. The amount of current that is supplied to the field winding of the second alternator may be adjusted such that the second alternator outputs a requested voltage (e.g., 14 volts). Method 600 proceeds to 612.

At 608, method 600 judges if the temperature mentioned at 602 is greater than a threshold temperature. If so, the answer is yes and method 600 proceeds to 610. Otherwise, the answer is no and method 600 returns to 604.

In this way, method 600 may operate two alternators. A first alternator may supply electric power solely to an electrically heated catalyst and a second alternator may supply electric power to a battery and ancillary electric power consumers. An amount of electric current that is supplied to a field winding of the first alternator may be adjusted to adjust an amount of power that is output by the first alternator.

Thus, the method of FIG. 5 provides for a method for operating an electrically heated catalyst, comprising: supplying electric energy to a field winding of an alternator in response to a temperature; and ceasing to supply electric energy to the field winding of the alternator in response to the temperature. The method includes where the electric energy is provided via a controller, and further comprising supplying electric energy from the alternator to an electrically heated catalyst when supplying electric energy to the field winding of the alternator. The method includes where the alternator is a three phase alternator and where the electrically heated catalyst is a three phase electrical load. The method includes where the temperature is a temperature of an exhaust system. The method includes where the temperature is an exhaust gas temperature. The method includes where electric energy is supplied to the field winding when the temperature is less than a threshold. The method includes where electric energy is not supplied to the field winding when the temperature is greater than a threshold. The method includes where the alternator is included in a vehicle and further comprising: supplying electric energy to a field winding of a second alternator of the vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle system, comprising:
an engine;
a first alternator including an armature, the armature not in electrical communication with an electric energy storage device;
a second alternator;
an electrically heated catalyst electrically coupled to the first alternator and not electrically coupled to the second alternator; and
the electrically heated catalyst electrically coupled to the second alternator.

2. The vehicle system of claim 1, further comprising a controller including executable instructions stored in non-transitory memory that cause electric current to be supplied to a field winding of the first alternator when the first alternator is supplying electrical energy to the electrically heated catalyst.

3. The vehicle system of claim 2, further comprising additional instructions that cause electric current to not be supplied to the field winding of the first alternator when the first alternator is not supplying electrical energy to the electrically heated catalyst.

4. The vehicle system of claim 3, further comprising additional instructions to prevent increasing electric current supplied to the field winding of the first alternator and increasing electric current supplied to a field winding of the second alternator at a substantially same time.

5. The vehicle system of claim 4, where the first alternator does not include a voltage rectifier.

6. The vehicle system of claim 4, further comprising additional instructions to vary an amount electric current provided to the field of the first alternator as a temperature of the electrically heated catalyst varies.

7. The vehicle system of claim 4, where the first alternator includes a voltage rectifier.

* * * * *